Patented Oct. 13, 1931

1,827,238

UNITED STATES PATENT OFFICE

HUGO JOOSTEN, OF NORDHAUSEN, GERMANY, ASSIGNOR OF ONE-THIRD TO TIEFBAU- UND KÄLTEINDUSTRIE-AKTIENGESELLSCHAFT VORMALS GEBHARDT & KOENIG, OF NORDHAUSEN IM HARZ, GERMANY, A CORPORATION OF GERMANY, AND ONE-THIRD TO SIEMENS-BAUUNION GESELLSCHAFT MIT BESCHRÄNKTER HAFTUNG KOMMANDITGESELLSCHAFT, OF BERLIN-SIEMENSSTADT, GERMANY, A CORPORATION OF GERMANY

PROCESS OF SOLIDIFYING PERMEABLE ROCK, LOOSELY SPREAD MASSES OR BUILDING STRUCTURES

No drawing. Application filed November 14, 1929, Serial No. 407,298, and in Germany November 14, 1928.

My invention relates to improvements in the process of solidifying permeable rock, loosely spread masses or building structures.

According to my invention the masses to be solidified and the like are first impregnated with silicic acid containing materials, alumina containing salt solutions or with other gel forming chemicals by forcing them into the mass, spraying them with the materials or treating them in any other suitable manner whereupon gases, such as carbonic acid gas, are applied to the thus impregnated mass. By the subsequent introduction of the gases into the material to be solidified and previously impregnated with the silicic material, such as waterglass, a guarantee is given that the substances react upon one another in the manner required to form a silicic acid regulus or another gel in status nascendi so that the surface forces then developing exert a solidifying action and produce a firm rock, stratum, mass or building structure, as the case may be. In first forcing in the liquid chemicals forming the gel the impregnation of the masses to be solidified need be carried so far only that the various constituents of the mass are enveloped or wetted by the liquid chemicals. Due to the cavities then remaining in the mass the subsequently introduced pressure gas easily penetrates into or through the mass, coming everywhere in good contact with the wetted constituents of the mass whereby a separation of silicic acid anhydride or its equivalent takes place under development of electrolytic effects. Any excess of liquid chemicals is distributed by the gas and driven forward.

If it is desired to solidify individual building structures of moderate bulk, the improved process may be carried out by immersing these parts in the gel forming solutions and then subjecting the parts to be solidified to the gas. If desired the masses to be solidified may be enclosed in a suitable container which is then filled with gas under pressure so that the action may penetrate right into the interior of the masses.

The advantage of the employment of gases over soluble chemicals resides in the fact that the gases are able to penetrate more easily into the smallest pores and fissures of the impregnated masses to be solidified. The gases which have entered the mass do not displace to previously introduced gel forming substances but a thin envelope of these substances around the minute particles of the mass to be solidified remains and suffices for the solidification, while any excess of the same is displaced by the gases and is forced further into the mass to be solidified whereby a larger volume is solidified than was originally impregnated with the gel forming chemicals.

A further advantage of my invention is that the gases may be condensed so that large quantities may be transported in a small space and freight, handling costs and so on are greatly reduced in comparison with chemicals soluble in water. By using condensed gases a considerable amount of machine accessories may also be saved since a force pump for forcing the solutions of the second chemical into the mass is no longer necessary.

Various gel forming chemicals to the desired number might be combined with one another into a solution and this solution might be used for impregnating the mass to be solidified.

Prior to introducing the liquid chemicals into the masses and the like to be solidified these masses might be saturated with clear water or with suitable solutions or the like in order to wash out or neutralize substances liable to interfere with the solidification.

My improved process is amongst others applicable to the solidification or tightening of permeable strata of rock, granular piled up masses under and above water, likewise within or without walls or pilings of wood, metal, concrete and the like. The process is likewise applicable to the tightening of building excavations, canals, barrages, dams and for all kinds of foundation work as well as in mining. The process may also be used for the solidification, preservation and strengthening of permeable and decayed building structures. The chemicals may then be injected into bore holes or the outer faces of the structures may be covered with a protective layer, the gases for forming the gels in status nascendi being then forced into or onto the structures.

I claim as my invention:

1. The process of solidifying permeable strata, loose masses or porous building structures, which consists in introducing into the mass to be treated silicic acid containing materials and a gas which reacts upon said materials to release silicic acid, which gels in situ from the nascent state and thus integrates the treated mass.

2. The process of solidifying permeable strata, loose masses or porous building structures, which consist in introducing into the mass to be treated silicic acid containing materials and carbon dioxide to release silicic acid, which gels in situ from the nascent state and thus integrates the treated mass.

3. The process of solidifying permeable strata, loose masses or porous building structures, which consists in introducing into the mass to be treated gel-forming chemicals and a gas which precipitates a gel from said chemicals.

4. The process of solidifying permeable strata, loose masses or porous building structures, which consists in introducing into the mass to be treated gel-forming chemicals and carbon dioxide.

In testimony whereof I affix my signature.

HUGO JOOSTEN.